(12) United States Patent
Labrot (10) Patent No.: US 9,855,727 B2
(45) Date of Patent: *Jan. 2, 2018

(54) GLASS PANE AS HEAD-UP DISPLAY (75) Inventor: Michael Labrot, Aachen (DE)

(73) Assignee: SEKISUI CHEMICAL CO., LTD., Osaka (JP)

( * ) Notice: Subject to any disclaimer, the term of this patent is extended or adjusted under 35 U.S.C. 154(b) by 568 days.

This patent is subject to a terminal disclaimer.

(21) Appl. No.: 13/819,197

(22) PCT Filed: Aug. 22, 2011

(86) PCT No.: PCT/EP2011/064354
§ 371 (c)(1),
(2), (4) Date: Jun. 3, 2013

(87) PCT Pub. No.: WO2012/038170
PCT Pub. Date: Mar. 29, 2012

(65) Prior Publication Data
US 2013/0242562 A1 Sep. 19, 2013

(30) Foreign Application Priority Data
Sep. 21, 2010 (EP) .................... 10177778

(51) Int. Cl.
*B32B 17/10* (2006.01)
*F21V 3/04* (2006.01)
(Continued)

(52) U.S. Cl.
CPC .. *B32B 17/10431* (2013.01); *B32B 17/10018* (2013.01); *B32B 17/10669* (2013.01); *B32B 17/10761* (2013.01); *C08K 5/0041* (2013.01); *F21V 3/0418* (2013.01); *G02B 27/01* (2013.01); *B32B 2367/00* (2013.01); *G02B 2027/0112* (2013.01); *G02B 2027/0194* (2013.01); *Y10T 428/266* (2015.01); *Y10T 428/269* (2015.01); *Y10T 428/2848* (2015.01)

(58) Field of Classification Search
USPC .............. 428/341, 354, 426, 412, 523, 474.4
See application file for complete search history.

(56) References Cited

U.S. PATENT DOCUMENTS 2,490,662 A 12/1949 Thomsen
5,549,786 A * 8/1996 Jones ................ H01L 21/31116
257/E21.252

(Continued)

FOREIGN PATENT DOCUMENTS

CN 1464884 A 12/2003
CN 101302301 A 11/2008
(Continued)

OTHER PUBLICATIONS

Breniaux et al., WO 2011042384A1, Composite glass pane as a head-up display, Apr. 14, 2011 (Machine Translation).*
(Continued)

*Primary Examiner* — Cheng Huang
(74) *Attorney, Agent, or Firm* — Cheng Law Group, PLLC (57) ABSTRACT

A glass pane is described. The glass pane has at least one pane, and one adhesive layer on the pane. The adhesive layer has at least one thermoplastic film with a luminescent pigment and a barrier film with an anti-scratch coating.

25 Claims, 5 Drawing Sheets (51) Int. Cl.
*G02B 27/01* (2006.01)
*C08K 5/00* (2006.01)

(56) References Cited

U.S. PATENT DOCUMENTS

| | | | |
|---|---|---|---|
| 5,573,842 | A | 11/1996 | Gutweiler |
| 6,002,505 | A | 12/1999 | Kraenert et al. |
| 6,072,686 | A | 6/2000 | Yarbrough |
| 6,670,603 | B2 | 12/2003 | Shimada et al. |
| 6,708,595 | B1 * | 3/2004 | Chaussade ........ B32B 17/10064 428/911 |
| 6,879,499 | B2 | 4/2005 | Matsumoto |
| 7,012,746 | B2 | 3/2006 | Bermel |
| 7,090,355 | B2 | 8/2006 | Liu et al. |
| 7,230,767 | B2 | 6/2007 | Walck et al. |
| 7,261,842 | B2 | 8/2007 | Henry et al. |
| 8,072,686 | B2 | 12/2011 | Cui et al. |
| 8,339,332 | B2 | 12/2012 | Kanou |
| 8,487,277 | B2 | 7/2013 | Labrot et al. |
| 8,519,362 | B2 | 8/2013 | Labrot et al. |
| 8,722,195 | B2 | 5/2014 | Labrot et al. |
| 2001/0005262 | A1 | 6/2001 | Tsurushima |
| 2001/0041251 | A1 | 11/2001 | Bravet et al. |
| 2002/0120916 | A1 | 8/2002 | Snider, Jr. |
| 2003/0166788 | A1 | 9/2003 | Papenfuhs |
| 2003/0193044 | A1 | 10/2003 | Henry et al. |
| 2005/0007562 | A1 | 1/2005 | Seki et al. |
| 2005/0074591 | A1 * | 4/2005 | Zagdoun ........................ 428/212 |
| 2005/0077647 | A1 | 4/2005 | Coyle et al. |
| 2006/0065735 | A1 | 3/2006 | Li et al. |
| 2006/0153558 | A1 | 7/2006 | Tan et al. |
| 2006/0171007 | A1 | 8/2006 | Chen et al. |
| 2006/0221021 | A1 | 10/2006 | Hajjar et al. |
| 2006/0221022 | A1 | 10/2006 | Hajjar |
| 2006/0227087 | A1 | 10/2006 | Hajjar et al. |
| 2006/0244925 | A1 | 11/2006 | Seki et al. |
| 2007/0014318 | A1 | 1/2007 | Hajjar et al. |
| 2007/0046176 | A1 | 3/2007 | Bukesov et al. |
| 2007/0187616 | A1 | 8/2007 | Burroughs et al. |
| 2007/0188417 | A1 | 8/2007 | Hajjar et al. |
| 2007/0206258 | A1 | 9/2007 | Malyak et al. |
| 2007/0228927 | A1 | 10/2007 | Kindler et al. |
| 2008/0203901 | A1 | 8/2008 | Bukesov et al. |
| 2008/0231738 | A1 | 9/2008 | Iida |
| 2008/0259431 | A1 | 10/2008 | Weichmann et al. |
| 2008/0291140 | A1 | 11/2008 | Kent et al. |
| 2008/0318063 | A1 | 12/2008 | Anderson |
| 2009/0033884 | A1 | 2/2009 | Yonekubo et al. |
| 2009/0115100 | A1 | 5/2009 | Nakai et al. |
| 2009/0141496 | A1 | 6/2009 | Yamamoto et al. |
| 2009/0153582 | A1 | 6/2009 | Hajjar et al. |
| 2009/0174632 | A1 | 7/2009 | Hajjar et al. |
| 2010/0063176 | A1 * | 3/2010 | Kato ..................... A61K 6/0276 523/116 |
| 2010/0243858 | A1 | 9/2010 | Newman et al. |
| 2010/0253600 | A1 * | 10/2010 | Seder ................ B32B 17/10036 345/7 |
| 2011/0073773 | A1 | 3/2011 | Labrot et al. |
| 2011/0074660 | A1 | 3/2011 | Hajjar et al. |
| 2011/0076473 | A1 | 3/2011 | Lin et al. |
| 2011/0109529 | A1 | 5/2011 | Hajjar et al. |
| 2011/0141150 | A1 | 6/2011 | Hajjar et al. |
| 2011/0164158 | A1 | 7/2011 | Iida |
| 2011/0176208 | A1 | 7/2011 | Kindler et al. |
| 2011/0181948 | A1 | 7/2011 | Kindler et al. |
| 2011/0291554 | A1 | 12/2011 | Bukesov et al. |
| 2012/0068083 | A1 | 3/2012 | Labrot et al. |
| 2012/0299328 | A1 | 11/2012 | Labrot et al. |
| 2014/0218803 | A1 | 8/2014 | Labrot et al. |
| 2014/0232707 | A1 | 8/2014 | Alschinger et al. |
| 2016/0011414 | A1 | 1/2016 | Joseph |

FOREIGN PATENT DOCUMENTS

| | | | |
|---|---|---|---|
| DE | 822714 | C | 11/1951 |
| DE | 4024330 | A1 | 2/1992 |
| DE | 19918811 | A1 | 11/2000 |
| DE | 10002152 | A1 | 7/2001 |
| DE | 10350529 | A1 | 3/2005 |
| DE | 102005061855 | A1 | 7/2007 |
| DE | 60314613 | | 6/2008 |
| DE | 102009044181 | A1 | 4/2011 |
| DE | WO 2011042384 | A1 * | 4/2011 ....... B32B 17/10036 |
| EP | 0157030 | | 10/1985 |
| EP | 0734852 | A2 | 10/1996 |
| EP | 0990941 | | 4/2000 |
| EP | 2110237 | A1 | 10/2009 |
| EP | 2233962 | A2 | 9/2010 |
| FR | 2929016 | A1 | 9/2009 |
| FR | 2929017 | | 9/2009 |
| GB | 2424382 | A | 9/2006 |
| JO | 2004-341210 | A | 12/2004 |
| JP | EP 0597391 | A1 * | 5/1994 ............. C03C 17/34 |
| JP | H07149988 | A | 6/1995 |
| JP | H09327898 | A | 12/1997 |
| JP | H10119110 | A | 5/1998 |
| JP | 2000-168352 | A | 6/2000 |
| JP | 2001113588 | A | 4/2001 |
| JP | 2001-249399 | A | 9/2001 |
| JP | 2002241371 | A | 8/2002 |
| JP | 2003340851 | A | 12/2003 |
| JP | 2007001122 | A | 1/2007 |
| JP | 2007-527548 | A | 9/2007 |
| JP | 2008-235681 | A | 10/2008 |
| JP | 2008-260498 | A | 10/2008 |
| JP | 2009-86182 | A | 4/2009 |
| JP | 2009-139940 | A | 6/2009 |
| JP | 2009145846 | A | 7/2009 |
| JP | 2009-539120 | A | 11/2009 |
| JP | 2010-243940 | A | 10/2010 |
| JP | 2010-271443 | A | 12/2010 |
| KR | 10-1999-0071481 | A | 9/1999 |
| KR | 1020000068557 | A | 11/2000 |
| KR | 10-2005-0086398 | A | 6/2005 |
| WO | 194496 | A | 12/2001 |
| WO | 2004/099172 | | 11/2004 |
| WO | 2007/039850 | A1 | 4/2007 |
| WO | 2008/132368 | A2 | 11/2008 |
| WO | 2010139889 | A1 | 12/2010 |

OTHER PUBLICATIONS

PCT International Search Report mailed on Nov. 3, 2011 for PCT Application PCT/EP2011/064354 filed on Aug. 22, 2011 in the name of Saint-Gobain Glass France (English + German).

PCT Written Opinion mailed on Nov. 3, 2011 for PCT Application PCT/EP2011/064354 filed on Aug. 22, 2011 in the name of Saint-Gobain Glass France (English + German).

Edge, M. et al. "Identification of luminescent species contributing to the yellowing of poly(ethylene terephthalate) on degradation" Polymer vol. 36; No. 2; 1995; pp. 227-234.

Day, M., et al., Photochemical Degradation of Poly (ethylene Terephthalate). I. Irradiation Experiments with the Xenon and Carbon Arc, J. Applied Polymer Science Jan. 1972, 16: 175-189.

International Search Report for PCT/EP2010/064734 filed Oct. 4, 2010 on behalf of Saint-Gobain Glass France. Dated Jan. 19, 2011. 7 pages. German original + English translation.

Written Opinion for PCT/EP2010/064734 filed Oct. 4, 2010 on behalf of Saint-Gobain Glass France. Dated Jan. 19, 2011. 15 pages. German original + English translation.

Written Opinion for PCT/EP2012/052338 filed Feb. 10, 2012 on behalf of Saint-Gobain Glass France. Dated Nov. 5, 2012. 13 pages. German original + English translation.

International Search Report for PCT/EP2012/052338 filed Feb. 10, 2012 on behalf of Saint-Gobain Glass France. Dated Nov. 5, 2012. 7 pages. German original + English translation.

Written Opinion for PCT/EP2012/064666 filed Jul. 26, 2012 on behalf of Saint-Gobain Glass France. Dated Oct. 5, 2012. 13 pages. German original + English translation.

(56) References Cited

OTHER PUBLICATIONS

International Search Report for PCT/EP2012/064666 filed Jul. 26, 2012 on behalf of Saint-Gobain Glass France. Dated Oct. 5, 2012. 9 pages. German original + English translation.
Non-Final Office Action for U.S. Appl. No. 13/499,235, filed Aug. 2, 2012 on behalf of Michael Labrot. Dated Oct. 1, 2013. 13 pages.
Notice of Allowance for U.S. Appl. No. 13/499,235, filed Aug. 2, 2012 on behalf of Michael Labrot. Dated Mar. 14, 2014. 7 pages.
Non-Final Office Action for U.S. Appl. No. 14/110,916, filed Dec. 11, 2013 on behalf of Michael Labrot. Dated Nov. 12, 2015. 18 pages.
Final Office Action for U.S. Appl. No. 14/110,916, filed Dec. 11, 2013 on behalf of Michael Labrot. Dated May 13, 2016. 14 pages.
Notice of Allowance for U.S. Appl. No. 14/110,916, filed Dec. 11, 2013 on behalf of Michael Labrot. Dated Jan. 4, 2017. 9 pages.

* cited by examiner

PRIOR ART

GLASS PANE AS HEAD-UP DISPLAY

CROSS REFERENCE TO RELATED APPLICATIONS

The present application is the US national stage of International Application PCT/EP2011/064354 filed on Aug. 22, 2011 which, in turn, claims priority to European Patent Application EP 10177778.7 filed on Sep. 21, 2010.

The invention relates to a glass pane, a method for producing the glass pane, and its use as a head-up display.

Head-up displays (HUDs) are widespread in aviation. The systems mounted in the direct field of vision of pilots display the most important data about their own and other aircraft. These systems, established and much used in the military sector, also have many possibilities for use in the civil sector, in particular in the automobile sector. Thus, data about the speed, the distance from the preceding vehicle or directional data from the navigation equipment can, in contrast to head-down displays (HDDs), be displayed right at the eye level of the driver. These capabilities clearly improve the traffic safety of the vehicle as the driver cannot watch the traffic situation while looking at the instruments. At increased speeds of the motor vehicle, on freeways, for example, the distance traveled "blind" by the vehicle can be significant and can cause an increased accident risk.

If head-up displays (HUDs) are illuminated by an external light source, such as a laser, the light fields can be seen only with difficulty depending on the prevailing light and weather conditions. Strong sunlight and light reflection through drops of water or particles of dirt make seeing the data projected in the head-up display significantly more difficult. This is particularly clearly evident with virtual images that are projected onto the display area, for example, the front window. Disadvantages of these conventional HUDs are also the limited field of vision for presentation of the projected data. Real images generated on the display area by electromagnetically excited dyes or pigments constitute a possible approach to a solution. In this case, the entire pane can, in principle, be used as a data carrier.

Because of the size of the pane and the tendency of the pigments to distribute themselves uniformly in the adhesive layer, relatively high concentrations of the chromophoric pigments are necessary. The treatment of the glass pane in the autoclave intensifies the dissolution of the pigments in the adhesive layer. However, in many cases, high pigment concentrations are very expensive and sometimes require special precautionary measures in light of the regulatory classification and handling of pigments or dyes as hazardous substances.

DE 603 14 613 T2 discloses a photochromic composition and a method for its production. The composition contains a linear, cross-linkable polyurethane or polyurethane-urea polymer and a photochromic organic compound.

WO 2004099172 A1 discloses a photochromic composition on a benzo-, naphtho-, and phenathrochromic structure substituted with an arylamine group.

U.S. Pat. No. 7,230,767 B2 discloses an image display system in a motor vehicle window pane. The arrangement contains luminescent compounds on the outward facing side of the inner pane. The luminescent compounds are illuminated by a light source and appear in the field of vision of an automobile driver.

The object of the invention is to provide a glass pane that can be used as a head-up display and enables good recognizability as well as high luminosity in one or a plurality of colors under all light conditions even with low pigment or dye concentrations.

The object of the present invention is accomplished according to the invention by means of the independent claim 1. Preferred embodiments are given by the subclaims.

A method according to the invention for producing a glass pane with head-up display, a device, and their use emerge from other coordinated claims.

The glass pane according to the invention comprises at least one pane and at least one polymer adhesive layer. The pane preferably contains flat glass (float glass), quartz glass, borosilicate glass, soda lime glass. The pane preferably has average light transmission (unless otherwise specified as light transmission for light type A and a 2°-standard observer according to DIN 5033 for light of the wavelengths from 380 nm to 780 nm) of more than 80%, preferably more than 90%. The pane preferably has light transmission of >70%, particularly preferably 75% in the wavelength range from 360 nm to 420 nm.

The adhesive layer contains at least a first luminescent pigment, a thermoplastic film, and a barrier film. The adhesive layer is disposed with the thermoplastic film side on the pane and fixedly bonded to the pane. The barrier film is disposed on the side of the adhesive layer facing away from the pane. The thermoplastic film preferably contains PVB (polyvinyl butyral) or EVA (poly-ethyl-vinyl acetate). The luminescent first pigments are preferably contained in the entire first thermoplastic film volume. The barrier film acts as a diffusion barrier for the luminescent pigments. The anti-scratch coating on the side of the barrier film facing away from the pane acts as a hard, scratch-resistant surface. The harrier film preferably contains less than 20%, particularly preferably less than 10%, and more particularly preferably less than 1% of the concentration of luminescent pigment than in the thermoplastic film. The luminescent pigments contain, in the context of the invention, organic andor inorganic luminescent compounds, ions, aggregates, andor molecules. Luminescence includes fluorescence andor phosphorescence processes, excitation with electromagnetic radiation, and emission of electromagnetic radiation. The radiation emitted preferably has a different wavelength from the exciting radiation. The radiation emitted preferably has a higher wavelength. The thermoplastic film and further thermoplastic films, if any, preferably have light transmission of >70%, particularly preferably >82%, measured at a wavelength of 405 nm. The light transmission of the thermoplastic films can he adjusted by film thickness, polymer composition, degree of polymerization, distribution of polymerization, UV blockers, or plasticizers.

The harrier film preferably contains polybutylene terephthalate (PBT), polycarbonate (PC), polyethylene terephthalate (PET), and polyethylene naphthalate (PEN), polyvinyl chloride (PVC), polyvinyl fluoride (PVF), polyvinyl butyral (PVB) without plasticizer, andor copolymers thereof, particularly preferably polyethylene terephthalate (PET).

The harrier film preferably has light transmission of >70%, particularly preferably >80%, measured at a wavelength of 405 nm.

The thermoplastic film preferably has light transmission of >75%, preferably >82%, in the wavelength range from 390 nm to 410 nm.

The adhesive layer preferably contains PVC (polyvinyl chloride), RV (polyurethane), EVA (poly-ethyl vinyl acetate), and mixtures as well as copolymers thereof.

The barrier film preferably contains a second luminescent pigment or dye. The second luminescent pigment preferably has a different excitation wavelength and emission wavelength from the first luminescent pigment. Alternatively, further thermoplastic films with luminescent pigments and barrier films lying therebetween can be disposed.

The adhesive layer preferably contains no other UV blockers active in the range of the excitation spectrum of the fluorescent particles between 360 nm and 400 nm. The luminescent pigments according to the invention preferably act as UV blockers.

The luminescent pigment preferably has a local excitation maximum in the range from 350 nm to 450 nm, particularly preferably 390 nm to 420 nm.

The luminescent pigment preferably has a local emission maximum in the range from 400 nm to 800 nm.

The anti-scratch coating preferably contains organically andor inorganically bound $SiO_2$, $TiO_2$, $Al_2O_3$, $Si_3N_4$, preferably polysiloxane. The anti-scratch coating is disposed on the barrier film on the side of the adhesive layer facing away from the pane.

The adhesive layer preferably has a thickness of 0.30 mm to 1.2 mm, preferably 0.70 mm to 0.90 mm. The barrier film preferably has a thickness of 0.10 mm to 0.30 mm. The thermoplastic film preferably has a thickness of 0.3 mm to 0.9 mm.

The luminescent pigment preferably contains a hydroxyalkyl terephthalate with the formula: $R_1$—COO—P(OH)x (0-4)-COO—$R_2$, where $R_1$, $R_2$ is an alkyl or allyl residue with 1 to 10 C atoms, P is a phenyl ring, OH is hydroxyl groups bonded to the phenyl ring, and x is the number of hydroxyl groups bonded to the phenyl ring. The general structural formula is:

The luminescent pigment preferably contains diethyl 2,5-dihydroxyterephtalate. The structural formula is:

The luminescent pigment preferably contains benzopyranes, naphthopyranes, 2H-naphthopyranes 3H-naphthopyranes, 2H-phenanthropyranes, 3H-phenanthropyranes, photochromic resins, coumarins, xanthines, naphthalinic acid derivatives, oxazoles, stilbenes, styryls, perylenes, naphthalimides, naphthals, phenyls, xanthenes, lanthanides, preferably $Y_2O_3$:Eu, $YVO_4$:Tm, $Y_2O_2S$:Pr, $Gd_2O_2S$:Tb, andor mixtures thereof.

The thermoplastic film preferably contains 0.1 $gm^2$ to 15 $gm^2$ of luminescent pigment. The quantity indications are based on a thickness of the thermoplastic film of roughly 0.76 mm.

The pane preferably has a thickness of 1 mm to 8 mm, particularly preferably 1.4 mm to 2.5 mm.

The barrier film preferably has a coating, preferably a metallic coating, particularly preferably, ZnO, Ag, $In_2O_3$, $TiO_2$, AlN. The coating intensifies the action of the barrier film as a diffusion barrier for the luminescent pigments or dyes. The coating is preferably disposed on the barrier film adjacent the thermoplastic film.

The invention further comprises a device for displaying a pictogram, numbers, and graphic characters. The device comprises a glass pane as described above and a light source directed to the glass pane. The light source emits electromagnetic radiation, preferably electromagnetic radiation of the wavelength of 360 nm to 420 nm. The radiation emitted by the light source is absorbed by the luminescent pigments in the adhesive layer and is re-emitted with a changed wavelength. This emitted radiation is perceived by the viewer as a pixel on the pane. The light source preferably comprises a diode laser or laser scanner.

The invention further comprises a method for producing a glass pane. In a first step, a thermoplastic film (preferably PVB or EVA) and a barrier film (preferably PET) with an anti-scratch coating (preferably polysiloxane) are bonded to form an adhesive layer (lamination film) on the outside of the barrier film. Then, a luminescent pigment is applied on the thermoplastic film side of the adhesive layer. In the following step, the adhesive layer is laminated between a pane (on the thermoplastic film side) and a lamination pane (on the barrier film side having the anti-scratch coating). The lamination preferably occurs at temperatures from 120° C. to 170° C., a pressure of 10 bar to 15 bar, and for a period of 30 min to 240 min. During lamination, the luminescent pigments are distributed preferably uniformly in the entire thermoplastic film and only slightly in the barrier film. After lamination, the barrier film preferably contains less than 1 wt.-% of a first luminescent pigment in the thermoplastic film. Subsequently, the lamination pane is carefully removed and a composite of a pane and an adhesive layer is obtained.

The luminescent pigment is preferably applied by spraying, screen printing, offset printing, ink jet printing, andor flexographic printing.

The invention further comprises the use of the glass pane as transparent or (partially) tinted display systems, head-up display in buildings, motor vehicles, airplanes, andor helicopters, particularly preferably as windshield in motor vehicles.

In the following, the invention is explained in detail with reference to the drawings and an exemplary embodiment as well as a comparative example. The drawings are purely schematic representations and are not to scale. They in no way restrict the invention.

They depict.

Figure 1:
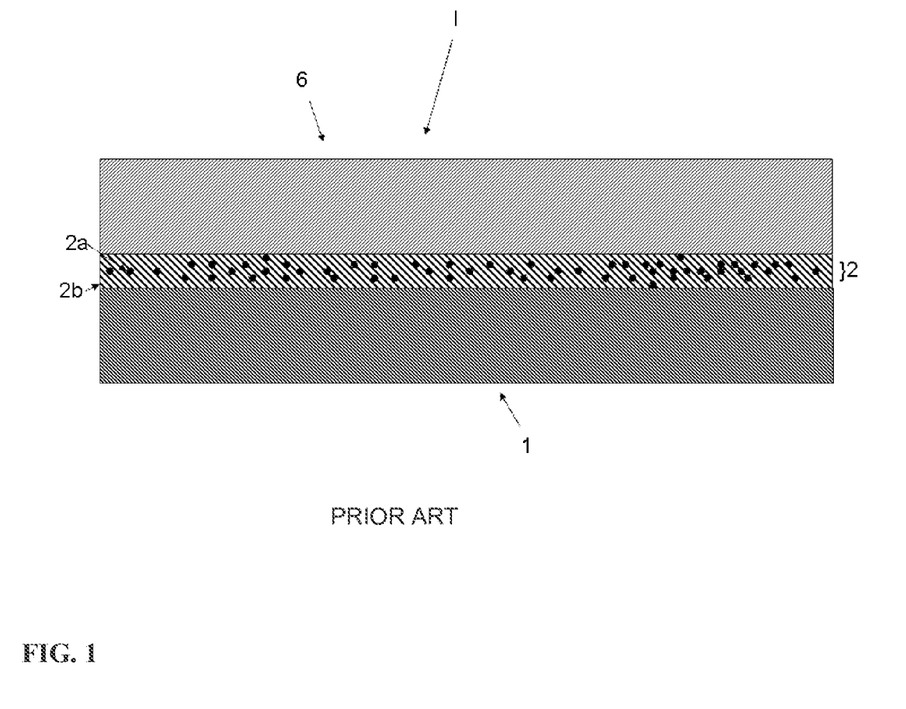
FIG. 1 a cross-section of a laminated glass pane with luminescent particles according to the prior art, FIG. 2 a cross-section of a glass pane according to the invention, FIG. 3 a cross-section of the adhesive layer according to the invention, FIG. 4 a cross-section of a preferred embodiment of the adhesive layer according to the invention, FIG. 5 a schematic view of the device according to the invention.

FIG. 1 depicts a cross-section of a glass pane (I) with luminescent particles (2a) according to the prior art. The glass pane (I) comprises at least one pane (1), one other pane (6), and at least one polymer adhesive layer (2). The adhesive layer (2) comprises a thermoplastic film (2b) made of PVB and luminescent pigments or dyes (2a), which are statistically distributed in the thermoplastic film (2b) after lamination of the glass pane (I). The broad distribution of the pigments (2a) in the thermoplastic film (2b) makes a high pigment concentration necessary, since luminosity is adequately high only with high pigment density (2a).

Figure 2:
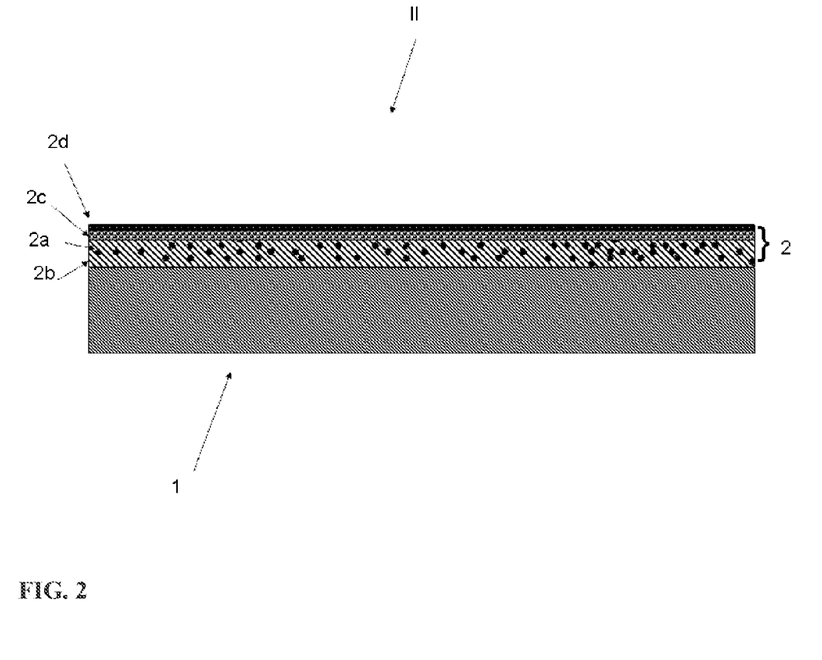

FIG. 2 depicts a cross-section of a glass pane (II) according to the invention. The glass pane (II) comprises at least one pane (1) and at least one polymer adhesive layer (2). The adhesive layer (2) comprises a first thermoplastic film (2b) made of PVB and luminescent pigments (2a) distributed in the thermoplastic film (2b). Following the first thermoplastic film (2b) is a barrier film (2c) made of PET, which is virtually free of luminescent pigments or dyes (2a). The expression "virtually free" means, in the context of the invention, no emission of electromagnetic radiation in the barrier film (2c) discernible to the naked eye upon excitation with a suitable radiation source. The barrier film (2c) contains an anti-scratch coating (2d) made of polysiloxane.

Figure 3:
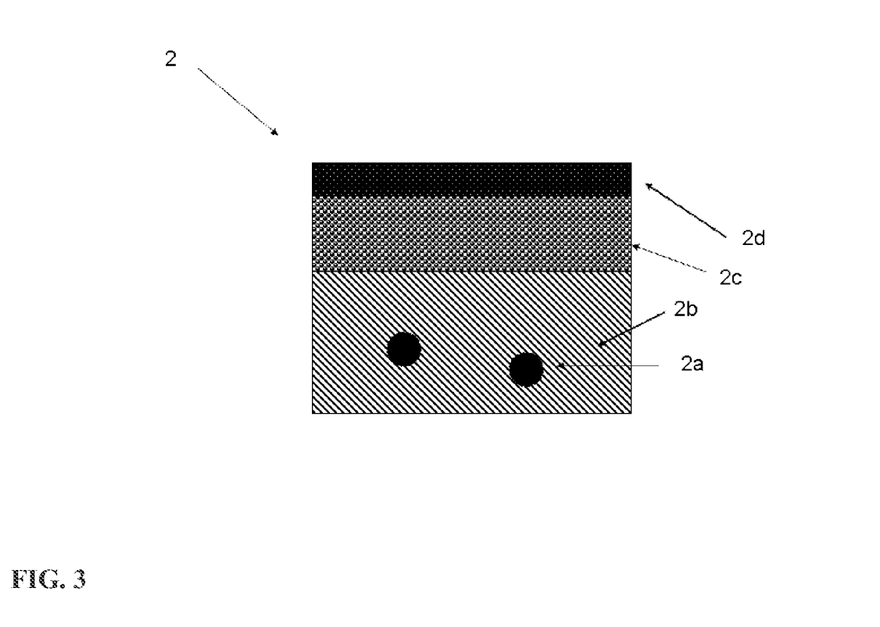

FIG. 3 depicts an enlarged cross-section of the adhesive layer (2) according to the invention made of the thermoplastic film (2b) with luminescent particles (2a) as well as the barrier film (2c) following the thermoplastic film (2b) and anti-scratch coating (2d) made of polysiloxane.

Figure 4:
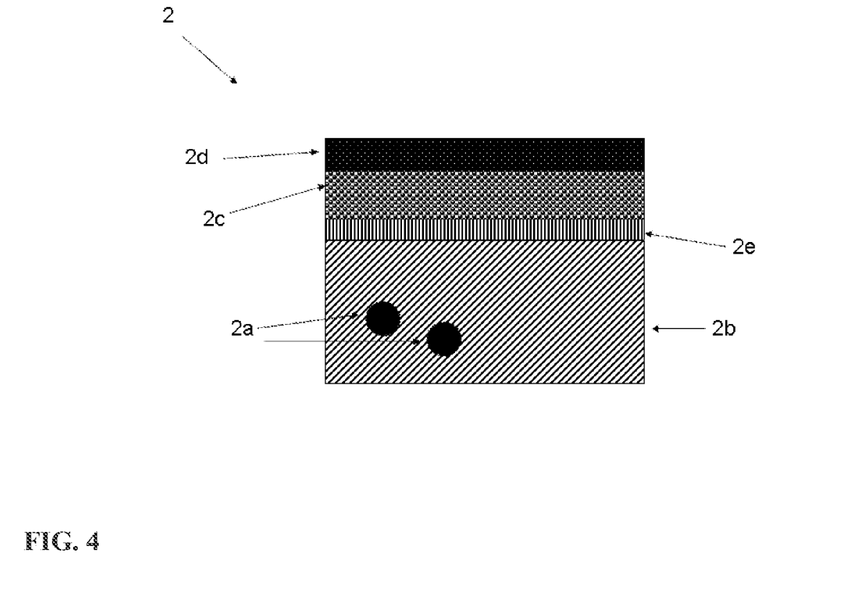

FIG. 4 depicts an enlarged cross-section of a preferred embodiment of the adhesive layer (2) according to the invention made of a thermoplastic film (2b) with luminescent particles (2a) and the barrier film (2c) following the first thermoplastic film (2b) and anti-scratch coating (2d). The barrier film (2c) has, adjacent the thermoplastic film (2b), a metallic coating (2e). This metallic coating can be implemented, for example, IR reflective or electrically heatable.

Figure 5:
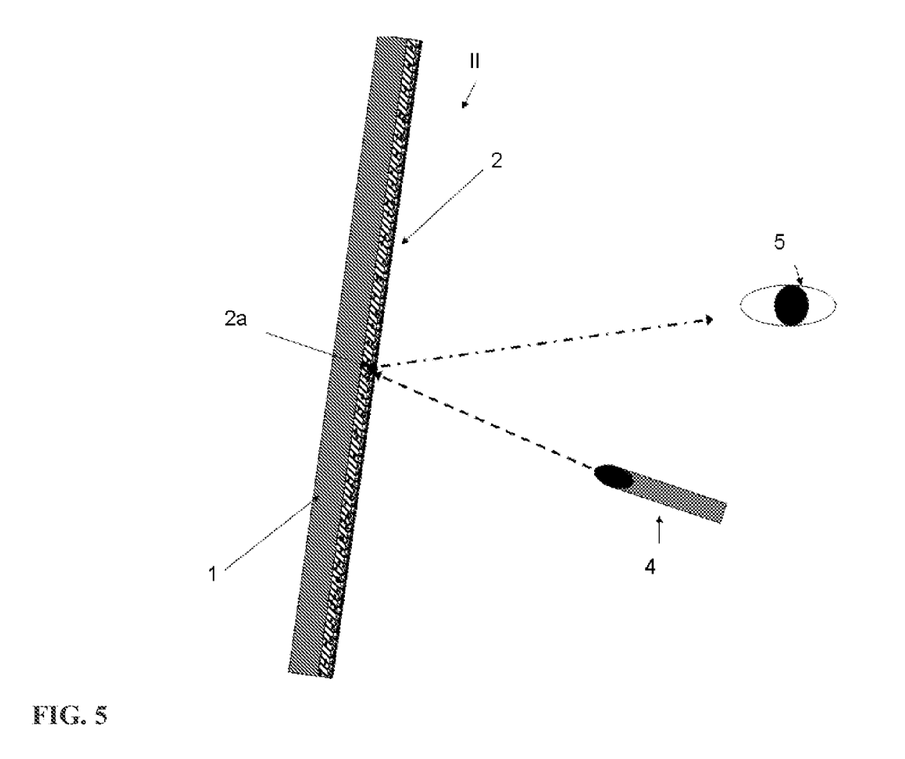

FIG. 5 depicts a cross-section of the device according to the invention. The glass pane (II) comprises a pane (1) and adhesive layer (2). The adhesive layer (2) is illuminated by a light source (4), preferably a laser scanner. The luminescent pigments (2a) situated in the adhesive layer (2) emit light that is perceived by the viewer.

LIST OF REFERENCE CHARACTERS (1) pane,
(2) adhesive layer,
(2a) luminescent pigment or dye,
(2b) thermoplastic film,
(2c) barrier film,
(2d) anti-scratch coating,
(2e) coating between barrier film and thermoplastic film,
(3) lamination pane,
(4) light source,
(5) viewer, and
(6) second pane,

The invention claimed is:

1. A glass pane, comprising:
a pane, and
an adhesive layer on the pane,
wherein the adhesive layer comprises at least one thermoplastic film with a first luminescent pigment and a barrier film with an anti-scratch coating, wherein the first luminescent pigment contains a hydroxyalkyl terephthalate with formula: $R_1$—COO—P(OH)xCOO—$R_2$ where $R_1$ $R_2$ is an alkyl or allyl residue with 1 to 10 C atoms, P is a phenyl ring, OH is hydroxyl groups bonded to the phenyl ring, and x is the number of hydroxyl groups bonded to the phenyl ring having a value between 0 and 4 and wherein the at least one thermoplastic film contains 0.1 g/m² to 15 g/m² of the first luminescent pigment.

2. The glass pane according to claim 1, wherein the barrier film contains a second luminescent pigment.

3. The glass pane according to claim 2, wherein the first luminescent pigment or the second luminescent pigment have an excitation maximum in a range from 350 nm to 450 nm, an emission maximum in a range from 400 nm to 800 nm, or an excitation maximum in a range from 350 nm to 450 nm and an emission maximum in a range from 400nm to 800 nm.

4. The glass pane according to claim 3, wherein the excitation maximum is in the range of 390 nm to 420 nm.

5. The glass pane according to claim 3, wherein the emission maximum is in the range from 430 nm to 500 nm.

6. The glass pane according to claim 1, wherein the pane comprises a prestressed or partially prestressed safety glass.

7. The glass pane according to claim 1, wherein the barrier film contains polybutylene terephthalate, polycarbonate, polyethylene terephthalate, polyethylene naphthalate, polyvinyl chloride, polyvinyl fluoride, polyvinyl butyral without plasticizer, and/or mixtures and copolymers thereof.

8. The glass pane according to claim 7, wherein the barrier film contains polyethylene terephthalate.

9. The glass pane according to claim 1, wherein the anti-scratch coating contains organically or inorganically bound $SiO_2$, $TiO_2$, $Al_2O_3$, or $Si_3N_4$.

10. The glass pane according to claim 9, wherein the anti-scratch coating contains organically or inorganically bound polysiloxane.

11. The glass pane according to claim 1, wherein the adhesive layer has a thickness of 0.30 mm to 0.9 mm.

12. The glass pane according to claim 11, wherein the adhesive layer has a thickness of 0.50 mm to 0.80 mm.

13. The glass pane according to claim 1, wherein the first luminescent pigment contains benzopyranes, naphthopyranes, 2H-naphthopyranes, 3H-naphthopyranes, 2H-phenanthropyranes, 3H-phenanthropyranes, photochromic resins, coumarins, xanthines, naphthalic acid derivatives, oxazoles, stilbenes, styryls, perylenes, lanthanides, and/or mixtures thereof.

14. The glass pane according to claim 13, wherein the first luminescent pigment contains $Y_2O_3$:Eu, $YVO_4$:Tm, $Y_2O_2S$:Pr, $Gd_2O_2S$:Tb, and/or mixtures thereof.

15. The glass pane according to claim 1, wherein the pane has a thickness of 1 mm to 8 mm.

16. The glass pane according to claim 15, wherein the pane has a thickness of 1.4 mm to 2.5 mm.

17. The glass pane according to claim 1, wherein the barrier film has a metallic coating.

18. The glass pane according to claim 17, wherein the metallic coating is ZnO, Ag, $In_2O_3$, Ti, $TiO_2$, and/or AlN.

19. A device for displaying a pictogram, graphic characters, and/or numbers, comprising:
the glass pane according to claim 1, and
a light source directed to the glass pane, wherein the light source emits electromagnetic radiation onto the glass pane.

20. The device according to claim 19, wherein the light source comprises a laser.

21. The device according to claim 20, wherein the laser is a diode laser.

22. The glass pane according to claim 1, wherein the first luminescent pigment contains diethyl 2,5-dihydroxyterephthalate.

23. A method for producing a glass pane, comprising:
bonding a at least one thermoplastic film and a barrier film with an anti-scratch coating to form an adhesive layer,
applying a luminescent pigment on the at least one thermoplastic film of the adhesive layer,
laminating the adhesive layer between a pane and a lamination pane,
removing the lamination pane, and
obtaining the glass pane having the pane and the adhesive layer on the pane, wherein the adhesive layer comprises the at least one thermoplastic film with the luminescent pigment and the barrier film with the anti-scratch coating, wherein the luminescent pigment contains a hydroxyalkyl terephthalate with formula: $R_1$—COO—P(OH)xCOO—$R_2$ where $R_1$, $R_2$ is an alkyl or allyl residue with 1 to 10 C atoms, P is a phenyl ring, OH is hydroxyl groups bonded to the phenyl ring, and x is the number of hydroxyl groups bonded to the phenyl ring having a value between 0 and 4 and wherein the at least one thermoplastic film contains 0.1 $g/m^2$ to 15 $g/m^2$ of luminescent pigment.

24. A method comprising:
using a glass pane as a head-up display in buildings, motor vehicles, airplanes, and/or helicopters,
wherein the glass pane comprises a pane and an adhesive layer on the pane, wherein the adhesive layer comprises at least one thermoplastic film with a first luminescent pigment and a barrier film with an anti-scratch coating, wherein the first luminescent pigment contains a hydroxyalkyl I terephthalate with formula: $R_1$—COO—P(OH)xCOO—$R_2$, where $R_1$, $R_2$ is an alkyl or allyl residue with 1 to 10 C atoms, P is a phenyl ring, OH is hydroxyl groups bonded to the phenyl ring, and x is the number of hydroxyl groups bonded to the phenyl ring having a value between 0 and 4 and wherein the at least one thermoplastic film contains 0.1 $g/m^2$ to 15 $g/m^2$ of the first luminescent pigment.

25. The method according to claim 24, wherein the glass pane is used as windshield motor vehicles or as a billboard.

* * * * *